June 5, 1923.
G. F. SHEVLIN
VALVE
Filed July 22, 1921
1,457,318
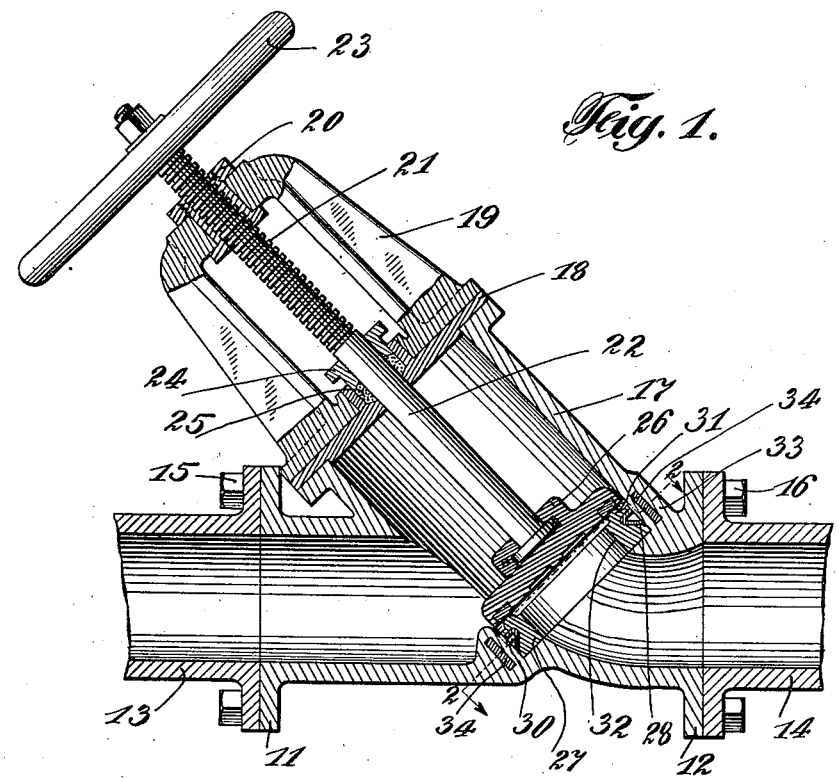
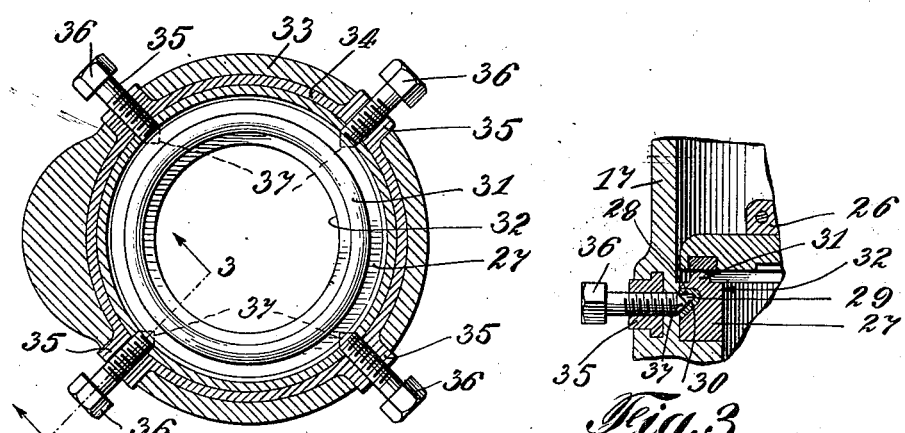
Inventor
George F. Shevlin
By
His Attorneys Patented June 5, 1923.

1,457,318

UNITED STATES PATENT OFFICE.

GEORGE F. SHEVLIN, OF GLENS FALLS, NEW YORK.

VALVE.

Application filed July 22, 1921. Serial No. 486,660.

*To all whom it may concern:*

Be it known that I, GEORGE F. SHEVLIN, a citizen of the United States, and a resident of Glens Falls, in the county of Warren and State of New York, have invented an Improvement in Valves, of which the following is a specification.

This invention relates to a valve, and more particularly that type of valve adapted for use in wood pulp digesters and other similar devices. Heretofore, in the use of valves designed and made for this purpose, due to the acids in the materials which are passed through the pipe lines in which the valves are included, the parts of the valve and particularly the valve seats thereof have become disintegrated, and consequently in order to make the required tight joint in the valve, the valve seat and oftentimes the valve have to be replaced at more or less frequent intervals. The object of the present invention is to overcome the difficulty heretofore experienced in removing the valve seat and replacing a new one. Also in valves of this construction, it is quite customary to make the valve body and other parts of the valve of a relatively soft metal as various compounds of lead, for example, in order to prevent the action of the acid on the body of the valve and the valve parts, and in the use of this relatively soft metal, it is practically impossible to employ an easily removable valve seat due to the impossibility of maintaining in position any devices for securing the valve seat in place. In carrying out my invention therefore, I have provided in the body of a valve made of relatively soft metal, a ring or other member of relatively hard metal to receive and maintain in position suitable devices for engaging and securing the valve seat in place in the valve body so that these devices may be easily removed and the valve seat disconnected and removed and replaced by a new valve seat when sufficiently worn or disintegrated to necessitate the change.

The valve made in accordance with my present invention will be hereinafter more particularly described in conjunction with the accompanying drawings in which,—

Fig. 1 is a central longitudinal cross section and partial elevation illustrating a valve fitted with my improvement, Fig. 2 is an enlarged cross section on line 2—2, Fig. 1, and Fig. 3 is a cross section on line 3—3, Fig. 2.

The valve made in accordance with my invention comprises, as is usual, a valve body 10 fitted with flanges 11 and 12 adapted to be secured in place in a pipe line, the adjacent parts of which are indicated at 13 and 14 respectively, by bolts 15 and 16 passing through the flanges of the valve body and parts of the pipe line, as is customary. The invention is also applicable to any form of valve whether it may be an angle valve, a V-valve, a straightway valve, a globe valve or a valve of any other type. As illustrated in the drawing, the valve body is provided with an offset member 17 fitted with a cover 18 to which is suitably secured a yoke member 19 having a bearing 20 for the screw threaded part 21 of the valve spindle 22. At its outer extremity, the valve spindle is fitted with a suitable wheel or handle 23, and this valve spindle, as illustrated, passes through a gland 24 and a suitable packing 25 provided therefor in the cover 18, and at its inner extremity within the valve body is adapted to carry the valve member 26.

Also within the valve body I employ a valve seat member 27. This is normally adapted to bear against a shoulder or seat provided therefor in the valve body. The valve seat member as illustrated has cast in the periphery thereof a ring 28 in which there is a circumferential recess 29, the surface at one side of which, as indicated at 30, is inclined for a purpose hereinafter described. The upper face of the valve seat is provided with a rib 31 adapted to contact with the valve member, and the opening in the valve seat is indicated at 32. As will be understood the valve seat is preferably made of white or other relatively soft metal like the body of the valve and the ring 28 of bronze or other relatively hard metal, and it will be noted that the peripheral portions of the valve seat above and below the recess in the ring cast therein are flush with the outer portion of the ring in order that this recess may be packed with graphite or other similar material to prevent the acid in the material passing through the valve from coming into contact with the ring and the parts associated therewith to cause the rapid disintegration thereof.

At the base of the offset portion of the body member of the valve, the same is preferably reinforced as indicated at 33, and within this reinforced portion of the body of the valve, in carrying out the invention, I cast a ring 34 of relatively hard metal. The other portions of the valve body, as will be understood, and as hereinbefore stated, are made of a relatively soft metal which is not attacked by the acid in the material which passes through the valve in the use thereof. In order to employ this ring member 34 for securing devices to hold the valve seat in position, the same in suitable positions is provided with lugs or bosses 35 extending to or appreciably beyond the surface of the reinforced portion or the valve body and suitably tapped to receive the stud bolts 36 which, at their extremities, are tapered as indicated at 37 so as to engage the beveled or inclined outer surface 30 of the ring in the valve seat to maintain the same in position against the shoulder provided therefor in the body of the valve.

From the foregoing description, it will now be apparent that the engagement between the screw or stud bolts and the tapped portions of the ring through which they are made to pass is sufficiently permanent to maintain the valve seat in position without working loose, due to the relatively soft material of which the valve body is constructed; and also that in order to remove the valve seat it is only necessary to turn the screws or stud bolts sufficiently far to free the tapered ends thereof from the inclined surface of the valve seat and after removing the valve seat and replacing it with a new one, the new valve seat is secured in position by returning the screws or stud bolts to their normal positions in which the tapered ends thereof contact with the inclined outer edge of the new valve seat and thus maintain the same in position.

I claim as my invention:

1. In a valve, a body member of relatively soft metal, a valve seat member therein, a member of relatively hard metal embedded in the valve body adjacent the valve seat position, and means associated with the said member of relatively hard metal for maintaining the valve seat in position in the valve body.

2. In a valve, a casing of relatively soft metal having a seat for a valve seat member, a valve seat member in the casing, a ring of relatively hard metal embedded in the casing adjacent the valve seat member, and means associated with the said ring for maintaining the said valve seat member in position on its seat in the casing.

3. In a valve, a casing of relatively soft metal, a valve seat member therein, a ring of relatively hard metal embedded in the casing adjacent the valve seat member and having a plurality of lugs thereon extending approximately to the surface of the casing, and means passing through and adjustable in the said lugs for engaging the said valve seat member to maintain the same in position in the casing.

4. In a valve, a casing of relatively soft metal, a valve seat member therein, a ring of relatively hard metal embedded in the casing adjacent the valve seat member and having a plurality of lugs in spaced positions and extending approximately to the surface of the said casing, and devices passing through the said lugs and adjustable therein exteriorly of the casing to engage the said valve seat member to maintain the same in position in the casing and to be disengaged from the said valve seat member to permit the same to be removed from the casing.

5. In a valve, a casing of relatively soft metal having a seat for a valve seat member, a valve seat member, a ring having an inclined surface cast in the periphery of the valve seat member, a ring member of relatively hard metal embedded in the said casing adjacent the seat for the valve seat member and having a plurality of spaced lugs extending therefrom to approximately the surface of the said casing, and means associated with the said lugs and adjustable to position therein exteriorly of the casing to engage the inclined surface of the ring in the valve seat member to maintain the valve seat member in position and to be disengaged from the valve seat member to permit the removal thereof from the casing.

6. In a valve, a casing of relatively soft metal having a seat for a valve seat member, a valve seat member, a ring having an inclined surface cast in the periphery of the valve seat member, a ring member of relatively hard metal embedded in the said casing adjacent the seat for the valve seat member and having a plurality of spaced lugs extending therefrom to approximately the surface of the said casing, and a stud bolt passing through each of the said lugs and adjustable to position therein exteriorly of the said casing, with the inner end of each of the stud bolts tapered to engage the inclined surface of the ring cast in the valve seat member to secure the same in position in the casing and also to be disengaged therefrom to permit the removal of the valve seat member from the casing.

Signed by me this 15th day of July, 1921.

GEO. F. SHEVLIN.